May 31, 1932.  H. B. CHALMERS  1,860,383
OSCILLATORY AND UNIDIRECTIONAL TORQUE MECHANISM
Filed Aug. 20, 1930  2 Sheets-Sheet 1

INVENTOR
Harry B. Chalmers
ATTORNEY

May 31, 1932. H. B. CHALMERS 1,860,383
OSCILLATORY AND UNIDIRECTIONAL TORQUE MECHANISM
Filed Aug. 20, 1930   2 Sheets-Sheet 2
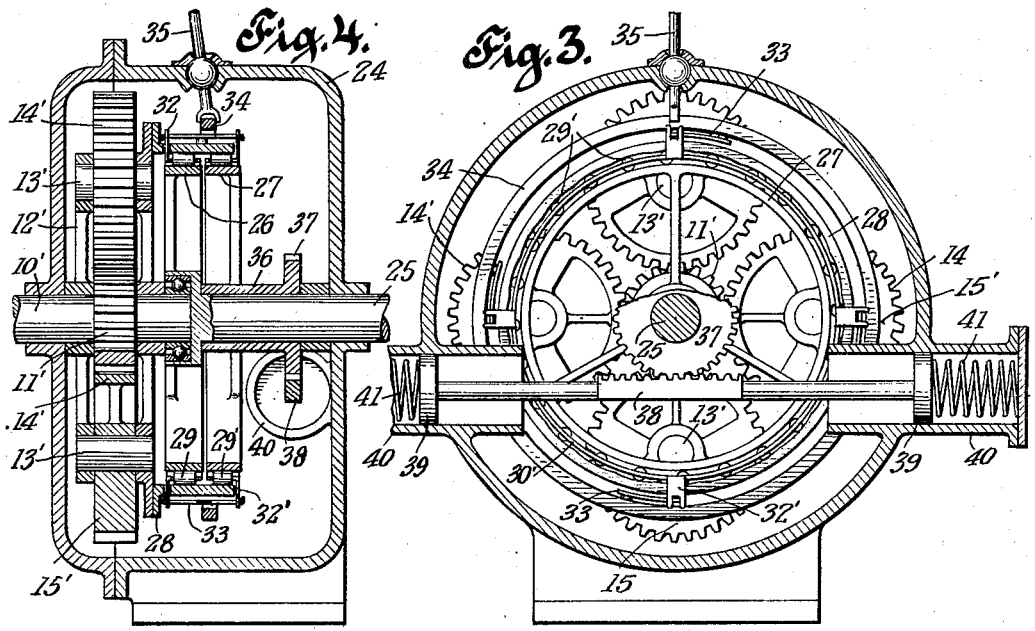
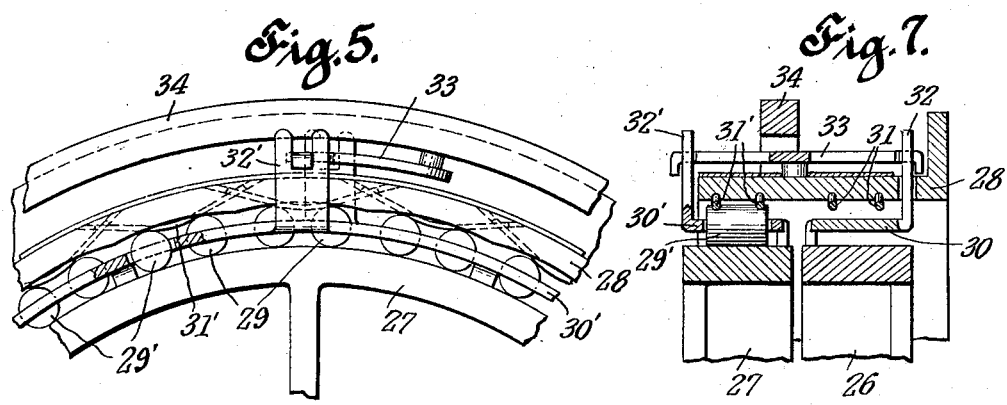
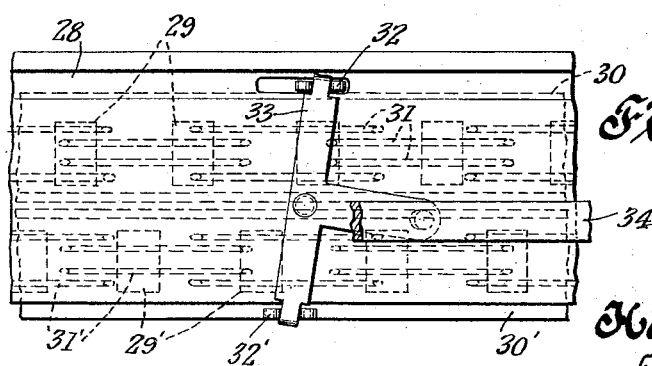
INVENTOR
Harry B. Chalmers
ATTORNEY Patented May 31, 1932

1,860,383

UNITED STATES PATENT OFFICE

HENRY B. CHALMERS, OF NEW YORK, N. Y.

OSCILLATORY AND UNIDIRECTIONAL TORQUE MECHANISM

Application filed August 20, 1930. Serial No. 476,457.

My invention relates to a power transmission system which provides means for converting rotary motion into oscillating impulses and utilizes the inertia of masses to effect the oscillation. The impulses result in motion inversely proportional to the resistance encountered in the driven mechanism. The direction of the impulses may be changed by any desired variation of the mechanical connections depending upon the intended use.

This system may be applied to shaking sieves, power presses, stone crushers, motor vehicles, vibrators, etc.

One form of application illustrated shows my invention as used to drive a rock crusher. Rotary motion of a driving shaft causes a central gear to rotate and drive a number of equi-toothed gears or pinions mounted in a frame concentric with the driving shaft arranged around it, each of the pinions having its center of gravity excentric with respect to its axis of rotation, and symmetrically with respect to the driving gear axis.

When the gear is rotated the centers of mass of the pinions move through equal angles about the pinion axes.

As the pinions revolve and their centers of mass rotate in one direction through 180° of angle from the position shown in Fig. 1, the inertia of the masses of the pinions imparts an impulse to the supporting frame and tends to move it in the same direction with respect to the center of the driving shaft. As the pinions are further rotated in the same direction through the next 180° the inertia of the masses of the pinions tends to move the supporting frame in the opposite direction with respect to the center of the driving shaft. The maximum impulses in each direction are obtained when the lines of action of the centers of mass of the pinions are tangential to the circular path of the centers of rotation of the pinion and varies between these maximum impulses and zero which obtains when the lines of action of the centers of mass pass their extreme inner and outer positions.

The resistance to these impulses varies with the friction and mechanical work to be done and may be so great that there is no motion of the frame, but as the speed of the drive shaft is increased the energy of the moving masses increases in proportion to the square of that speed and the impulses through at least a portion of the cycle are sufficient to overcome the mechanical resistance. If the mechanical resistance decreases the distance through which the impulses are effective to produce motion increases to produce a throw or travel.

The period of oscillation is the speed in R. P. M. of the driving shaft multiplied by the ratio of the pitch diameter of the gear over the pitch diameter of the pinions.

Fig. 3 is a view of my invention applied to a rotating shaft.

Fig. 4 is a vertical cross-section of Fig. 3.

Fig. 5 is a detail of a portion of the mechanism.

Fig. 6 is another view of Fig. 5.

Fig. 7 is a vertical section of Fig. 5.

Figure 1:
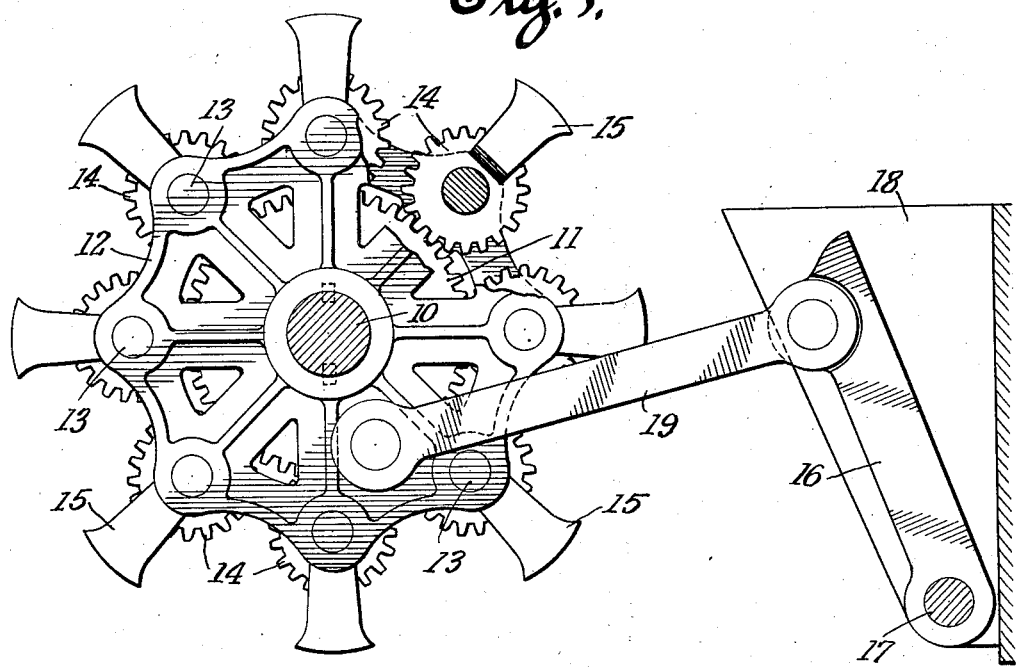
Fig. 1 is a view of my invention applied to drive a jaw rock crusher.
Figure 2:
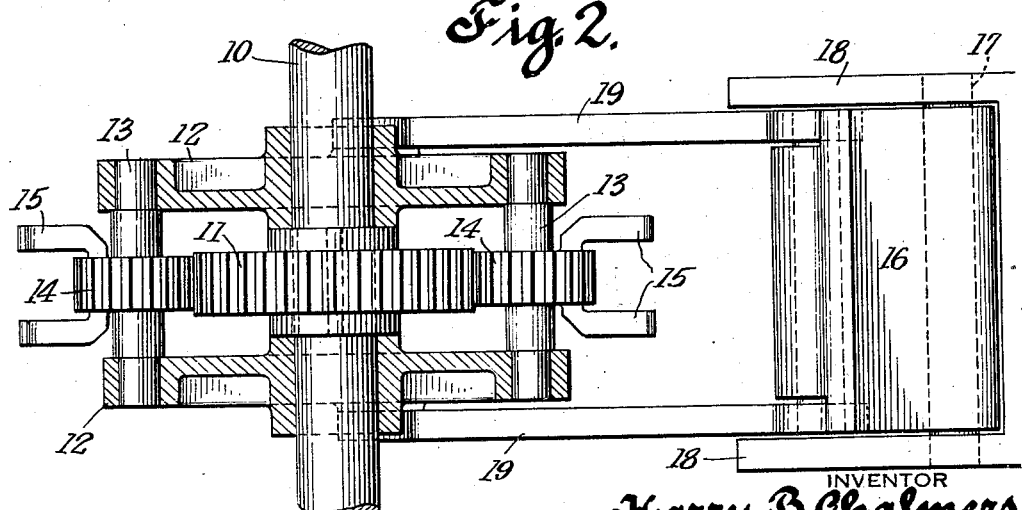
Fig. 2 is a top view of Fig. 1 with the upper half of the driving unit broken away to show the arrangement of gears and weights.

In the Figs. 1 and 2 shown 10 is a driving shaft suitably supported to which is fastened a driving gear 11 and on which are mounted concentric frame members 12, free to rotate about the shaft 10. Pins 13 are positioned in said frame members carrying pinions 14 which are eccentrically weighted by the masses 15. The jaw 16 of the rock crusher is hinged at 17 to the hopper 18 and is actuated by the link 19 suitably connected to the frame 12.

In operation the driving shaft 10 is rotated by any suitable power source and rotates the gear 11 and the pinions 14 with their eccentric weights 15. Due to the action of the inertia of the masses of the weights 15 impulses are imparted in the manner described to the frame 12 which tend to move it first in one direction about the center of the shaft 10 and then in the opposite direction about that center so that the frame receives oscillating impulses which are communicated to the crusher jaw 16 through the links 19.

In the position shown in Fig. 1 the centripetal forces of the centers of masses of the gears all act radially away from the center of the driving shaft and there is no resultant impulse acting to effect movement of the frame or spider about that center. As the shaft is rotated the outer gears are also rotated and the centripetal forces in each gear are exerted at gradually increasing angles with the radii of the gear centers. As these angles increase the constant centripetal force resolves into two components, one radially with respect to the shaft center which varies as the cosine of the angle and the other at right angles to that radius which varies as the sine of the angle, so that the maximum impulse effect in the direction of rotation about the shaft axis is exerted when the center of mass of the gear wheels is tangential to the circle which is described by the gear centers and alternates in direction for each 180° of angular rotation of the gears.

For the maximum effective power of transmission the eccentric masses should be arranged so as to act simultaneously in the same direction with respect to the axis of the carrier frame, i. e., all should move outwardly at the same time and inwardly at the same time.

This arrangement can be varied somewhat but the effectiveness decreases as the relation is changed so that if two masses move in opposite directions simultaneously they counteract each other and no torque is transmitted.

In the figures showing the application of my invention to a rotating shaft such as that of a gyratory crusher, machine tool, motor vehicle, etc., 24 is a suitable casing in which is mounted a driving shaft 10′ to which is fastened a driving gear 11′ and on which are mounted concentric frame members 12′ free to rotate about the shaft 10′. Pins 13′ are positioned in said frame members carrying pinions 14′ which are eccentrically weighted by the masses 15′.

The driver shaft 25 is mounted in the casing 24 in line with the driving shaft 10′ and carries the driver wheel 26. The damping pulley 27 is rotatably mounted on the driven shaft 25. The flange 28 is fastened to the frame 12′ and concentrically surrounds the driving wheel 26 and the damping pulley 27. The inner surface of the flange 28 is formed with shallow recesses in which rollers 29 in line with the driver pulley 26 and rollers 29′ in line with the damping wheel 27 are loosely positioned. The rollers 29 are further limited in their motion with respect to the recesses in the flange 28 by the retainer 30 and similarly the motion of the rollers 29′ is limited by the retainer 30′. Springs 31 loosely inserted in the flange 28 coact to press the rollers 29 against the face of the driver pulley 26 and a similar set of springs 31′ press the rollers 29′ against the face of the damping pulley 27.

At least at four points about the periphery of the retainer 30 are located positioning fingers 32 and approximately opposite these fingers are similar fingers 32′ extending from the retainer 30. These fingers are actuated by an equal number of double bell crank levers 33 which are centrally pivoted on the flange 28 and are operated by the reversing ring 34 and the reversing lever 35 mounted in the casing 24.

The driver wheel 26 has a recess in line with the driving shaft in which is located a centering bearing 36.

The damping pulley 27 carries a gear 37 adapted to engage a rack 38 which is positioned tangential to the gear 37 in a plane normal to the center line of the driver shaft 25. The rack is supported by pistons 39 which move in the direction of the travel of the rack and are supported in cylindrical dash pots 40 formed or mounted in the casing 24. Motion of the rack in either direction is opposed by the equalizing springs 41 in the dash pots which coact to return the rack to its central position.

In the operation of the device shown in Figs. 3 to 7 the driving shaft 10′ is rotated in the usual manner by a motive force such as an engine or motor, and the gear wheel 11′ rotates with it driving the inertia pinions 14′. Due to the action of the inertia of the masses of the pinions 15′ impulses are imparted to the frame 12″ which tend to move it first in one direction about the center of the shaft 10′ and then in the opposite direction about that center so that the frame 12′ receives oscillating impulses. The impulses in one direction are communicated through the frame 12′ to the flange 28, clutch roller 29 and driven wheel 26 to the driver shaft 25 and alternately, the impulses in the opposite direction pass from the clutch rollers 29′ to the damping pulley 27, gear wheel 37 and rack 38 to the dash pot pistons 39 centered in dash pots 40 by springs 41. The direction of the impulses delivered to the driven shaft depends upon the position of the reversing mechanism which moves the clutch rollers 29 and 29′ in relation to the masses in flange 28 by means of roller retainers 30 and 30′, fingers 32 and 32′, reversing ring 34 and reversing lever 35.

I claim:

1. Apparatus of the character described comprising a driving shaft, a gear carried thereby, a frame supported to oscillate about the axis of said shaft, a plurality of pinions rotatably carried by said frame and meshing with said gear, each of said pinions having an eccentrically disposed mass, an oscillating crusher member and means of connection between said member and said frame whereby the continuous rotation of said driving shaft imparts oscillation to said member through said frame.

2. Apparatus of the character described comprising a driving member, a frame rotatable about said member, a series of masses rotatably carried by said frame and rotatable with said frame and rotatable independently of said frame, by said driving member, each of said masses having its center of gravity eccentric of its axis of independent rotation, a driven member and clutch means of connection between said frame and said driven member for intermittently applying power to the driven member and permitting the driven member to rotate independently under certain circumstances, and resilient recoil means for checking the frame and intermittently returning power to the driven member.

3. Apparatus of the character described comprising a driving member, a frame rotatable about said member, a series of masses rotatably carried by said frame and rotatable with said frame and rotatable independently of said frame by said driving member, each of said masses having its center of gravity eccentric of its axis of independent rotation, a driven member and clutch means of connection between said frame and said driven member for intermittently applying power to the driven member and permitting the driven member to rotate independently under certain circumstances and pneumatic means for checking the movement of the frame and intermittently acting upon the driven member.

4. Apparatus of the character described comprising a driving member, a frame rotatable about said member, a series of masses rotatably carried by said frame and rotatable with said frame and rotatable independently of said frame by said driving member, each of said masses having its center of gravity eccentric of its axis of independent rotation, a driven member and clutch means of connection between said frame and said driven member for intermittently applying power to the driven member and permitting the driven member to rotate independently under certain circumstances and pneumatic and spring means serving to check the rotation of said frame and to impart impulses to the driven member.

5. Apparatus of the character described comprising a driving member, a frame rotatable about said member, a series of masses rotatably carried by said frame and rotatable with said frame and rotatable independently of said frame, by said driving member, each of said masses having its center of gravity eccentric of its axis of independent rotation, a driven member and clutch means of connection between said frame and said driven member for intermittently applying power to the driven member and permitting the driven member to rotate independently under certain circumstances and means for checking the frame and spring means for returning the checking means to its normal position of rest.

6. Apparatus of the character described comprising a driving member, a frame rotatable about said member, a series of masses rotatably carried by said frame and rotatable with said frame and rotatable independently of said frame, by said driving member, each of said masses having its center of gravity eccentric of its axis of independent rotation, a driven member and clutch means of connection between said frame and said driven member for intermittently applying power to the driven member and permitting the driven member to rotate independently under certain circumstances and a clutch intermittently transmitting power from the frame to the driven member, said clutch including bearing surfaces and two sets of rollers coacting between the bearing surfaces.

HENRY B. CHALMERS.